(12) United States Patent
dos-Santos et al.

(10) Patent No.: US 8,140,256 B1
(45) Date of Patent: Mar. 20, 2012

(54) DYNAMIC RIDE MATCHING SYSTEM

(75) Inventors: Sasha dos-Santos, Valrico, FL (US);
Sean J. Barbeau, Tampa, FL (US);
Philip L. Winters, Tampa, FL (US);
Rafael Perez, Temple Terrace, FL (US);
Miguel Labrador, Tampa, FL (US)

(73) Assignee: University of South Florida, Tampa, FL (US)

( * ) Notice: Subject to any disclaimer, the term of this patent is extended or adjusted under 35 U.S.C. 154(b) by 920 days.

(21) Appl. No.: 11/839,942

(22) Filed: Aug. 16, 2007

Related U.S. Application Data

(60) Provisional application No. 60/822,590, filed on Aug. 16, 2006.

(51) Int. Cl.
*G08G 1/123* (2006.01)
*G01S 1/00* (2006.01)
*G06F 19/00* (2006.01)

(52) U.S. Cl. ............... 701/202; 701/117; 705/6; 705/80

(58) Field of Classification Search .................. 701/202, 701/209, 117, 80, 319; 705/6, 7, 5, 1; 707/102; 455/414.1; 342/357.09
See application file for complete search history.

(56) References Cited

U.S. PATENT DOCUMENTS

| | | | |
|---|---|---|---|
| 5,799,263 A * | 8/1998 | Culbertson | 701/117 |
| 6,675,150 B1 * | 1/2004 | Camer | 705/8 |
| 6,751,548 B2 | 6/2004 | Fox et al. | |
| 2001/0037174 A1 * | 11/2001 | Dickerson | 701/200 |
| 2001/0056363 A1 * | 12/2001 | Gantz et al. | 705/9 |
| 2004/0049424 A1 * | 3/2004 | Murray et al. | 705/14 |
| 2006/0155460 A1 * | 7/2006 | Raney | 701/207 |
| 2006/0200306 A1 * | 9/2006 | Adamcyzk | 701/200 |

OTHER PUBLICATIONS

RidePro, Better Tools for Rideshare Management. Product Advertisement. Copyright 2005 of Trapeze Software, Inc. www.trapezegroup.com.

* cited by examiner

*Primary Examiner* — Tan Q Nguyen
(74) *Attorney, Agent, or Firm* — Molly L. Sauter; Courtney M. Dunn; Smith & Hopen, P.A.

(57) ABSTRACT

A ride matching method is disclosed herein. The ride matching method addresses many of the limitations associated with traditional dynamic ride matching applications. The method is unique in its ability to accept trips with schedules that cannot be expressed in terms of a simple recurrence pattern (e.g. Monday thru Friday work schedule). It can handle one-time and occasional trips. It is also distinct in its use of spatial analysis techniques to locate matches. Specifically, the use of a shortest path solver enables the ride matching method to perform a search along the path of a user's trip, in addition to the customary radial search around the endpoints. The shortest path solver is also used to calculate the driving distance between the user and a match. This provides a more accurate measurement than the straight-line distance used by other methods, especially in the presence of barriers.

19 Claims, 10 Drawing Sheets

| TRIPS | |
|---|---|
| Attribute | Description |
| Trip ID | Primary Key |
| User ID | The user associated with this trip. |
| Carpool Type | Indicates if the user prefers to be a driver or passenger. |
| Source Location | The Location ID for the source of the trip. |
| Destination Location | The Location ID for the destination of the trip. |
| Roundtrip | Indicates if the user would like to travel from the source to the destination and then back to the source. |
| Recurring | Indicates whether this trip occurs once or on a regular basis. |
| Earliest Depart Time - Leg 1 | The earliest time that the user can leave the source. |
| Latest Depart Time - Leg 1 | The latest time that the user can leave the source. |
| Earliest Arrive Time - Leg 1 | The earliest time that the user can arrive at the destination. |
| Latest Arrive Time - Leg 1 | The latest time that the user can arrive at the destination. |
| Earliest Depart Time - Leg 2 | The earliest time that the user can leave for the return trip. (Not applicable for one-way trips). |
| Latest Depart Time - Leg 2 | The latest time that the user can leave for the return trip. (Not applicable for one-way trips). |
| Earliest Arrive Time - Leg 2 | The earliest time that the user can arrive at the original source during the return trip. (Not applicable for one-way trips). |
| Latest Arrive Time - Leg 2 | The latest time that the user can arrive at the original source during the return trip. (Not applicable for one-way trips). |
| Start Date | The start date of this trip. |
| End Date | The end date of this trip. |
| Driving Time | The driving time of the shortest path from source to destination, as calculated by the algorithm. |
| Driving Distance | The length of the shortest path from source to destination, as calculated by the algorithm. |

| POINTS FEATURE CLASS ||
|---|---|
| Attribute | Description |
| Object ID | Primary Key |
| Shape | The coordinates of this line point |
| Trip ID | The unique Trip ID associated with this trip. This is a foreign key linking this class with the Trips table. |
| Class | 'S' is this point represents the source point. 'D' if this point represents the destination point. |

Figure 12

| SHORTEST PATH FEATURE CLASS ||
|---|---|
| Attribute | Description |
| Object ID | Primary Key |
| Shape | The coordinates of this line segment |
| Shape Length | The length of the line segment |
| Trip ID | The unique Trip ID associated with this trip. This is a foreign key linking this class with the Trips table. |

Figure 13

| POSSIBLE COMBINATIONS OF ROUNDTRIP/ONE-WAY PREFERENCE |||
|---|---|---|
| User | Potential Match | Accepted? |
| Round-trip | One-way | No |
| Round-trip | Round-trip | Yes |
| One-way | One-way | Yes |
| One-way | Round-trip | No |

Figure 14

| POSSIBLE COMBINATIONS OF DRIVER/PASSENGER PREFERENCE |||
|---|---|---|
| User | Potential Match | Accepted? |
| Driver | Driver | No |
| Driver | Passenger | Yes |
| Passenger | Driver | Yes |
| Passenger | Passenger | No |

Figure 15

| MATCHES ||
|---|---|
| Attribute | Description |
| Match ID | Primary Key |
| Trip ID 1 | A trip that is similar in schedule and path to the trip represented by Trip ID 2. |
| Trip ID 2 | A trip that is similar in schedule and path to the trip represented by Trip ID 1. |
| Driver | The Trip ID of the person who should be the driver. |
| Total Driving Distance | The total distance the driver must travel, including pick-up and drop-off of the passenger. |
| Total Driving Time | The total time the driver must travel, including pick-up and drop-off of the passenger. |
| Direction for Trip 1 | Indicates if Trip 2 can travel roundtrip, leg 1, or leg 2. |
| Direction for Trip 2 | Indicates if Trip 1 can travel roundtrip, leg 1, or leg 2. |
| Relative Direction | Indicates if both trips are traveling on the same leg, i.e. if both users travel together and they are both on leg 1 or leg 2 then the relative direction = same; if one traveler is on leg 1 while the other is on leg 2, then direction = opposite. |

Figure 16

DYNAMIC RIDE MATCHING SYSTEM

CROSS REFERENCE TO RELATED APPLICATIONS

This application claims priority to currently pending U.S. Provisional Patent Application 60/822,590, entitled, "Dynamic Ride Matching System", filed Aug. 16, 2006, the contents of which are herein incorporated by reference.

FIELD OF INVENTION

This invention relates to transportation management systems. More specifically, this invention relates to a dynamic ride matching system that matches drivers and passengers using a novel ride matching method.

SUMMARY OF INVENTION

This invention includes a method of matching individuals in an online community with others they could potentially carpool with based on preferences entered by the users and the similarities in their planned trips. In the traditional ride matching (carpooling) system, the user is asked the source and destination addresses for the trip, along with the days and times when the trip will take place. The addresses are converted into x and y coordinates. The list of potential matches is narrowed down to those that fit the trip schedule and a radial search is conducted around the source and destination points. Because this is a proven technique, the invention focuses on addressing the limitations of this approach. The main limitations that are addressed are: 1) limited trip schedules—existing methods are designed for regular weekly trips (e.g. Monday thru Friday) and cannot accept other recurrence patterns; 2) focus on the end points—existing methods search for matches by looking at the end points, but this ignores potential carpoolers that lie on the driver's route; and 3) reliance on straight-line distances—existing methods base driving distance calculations on straight-line distances instead of using the actual street network and straight-line estimates can vary greatly from the true distance when dealing with barriers such as rivers or highways.

The ride matching method addresses many of the limitations associated with traditional dynamic ride matching applications. The method is unique in its ability to accept trips with schedules that cannot be expressed in terms of a simple recurrence pattern (e.g. Monday thru Friday work schedule). It can handle one-time and occasional trips. It is also distinct in its use of spatial analysis techniques to locate matches. Specifically, the use of a shortest path solver enables the ride matching method to perform a search along the path of a user's trip, in addition to the customary radial search around the endpoints. The shortest path solver is also used to calculate the driving distance between the user and a match. This provides a more accurate measurement than the straight-line distance used by other method, especially in the presence of barriers.

BRIEF DESCRIPTION OF THE DRAWINGS

For a fuller understanding of the invention, reference should be made to the following detailed description, taken in connection with the accompanying drawings, in which:

FIG. 2B is an illustration of segment 1, the first 15% of the trip path.

FIG. 2C is an illustration of segment 2, the middle 70% of the trip path.

FIG. 2D is an illustration of segment 3, the last 15% of the trip path.

FIG. 12 is a description of the database attributes of the Points Feature Table. The Points Feature Table stores the geocoded source and destination points of all the trips taken by the users.

FIG. 13 is a description of the database attributes of the Shortest Path Feature Class Table. The Shortest Path Feature Class Table stores the path from the user's source to the user's destination calculated by a known shortest-path method.

FIG. 14 is a table of possible combinations of round-trip/one-way preferences.

FIG. 15 is a table of possible combinations of driver/passenger preferences.

FIG. 16 is a description of the database attributes of the Matches Table. The Matches Table stores all instances in which two users' paths and schedules are similar and all other criteria correlate to provide a match between the two users.

DETAILED DESCRIPTION OF THE PREFERRED EMBODIMENT

The present invention utilizes a geodatabase consisting of regular database tables and feature classes. Feature classes are tables that hold geographic shapes. The method requires a shortest path solver that determines the shortest path between two points in a street network.

Figure 17:
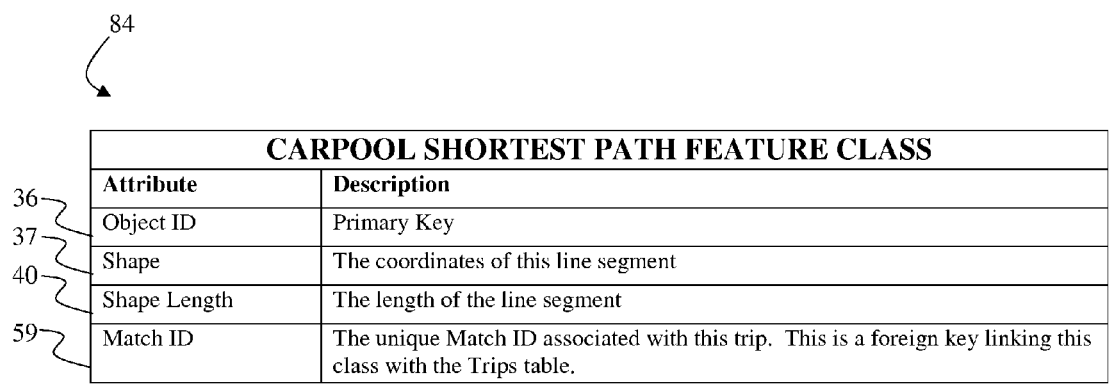
FIG. 17 is a description of the database attributes of the Carpool Shortest Path Feature Class Table. The Carpool Shortest Path Feature Class Table stores the shortest path between two points (source and destination point) in the Trips Feature Class.

The inputs for the method include a series of tables that describe the user's trip and the trips previously input by other users. In practice, additional fields may be added to the tables to support the user interface. The tables include the Trips Table (FIG. 9), the Locations Table (FIG. 10), the Trip Schedules Table (FIG. 11), and the Matches Table (FIG. 16). The feature classes include the Points Feature Class (FIG. 12), the Shortest Path Feature Class (FIG. 13), and the Carpool Shortest Path Feature Class (FIG. 17).

Figure 9:
FIG. 9 is a description of the database attributes of the Trips Table. The Trips Table stores the trips taken by the users.

Trips Module: In one embodiment, the invention stores a plurality of parameters relating to the trips to be taken by the users. In a preferred embodiment, these parameters are stored in a Trips Table (10). A description of each of the attributes of the Trips Table (10) is shown in FIG. 9. The Trips Table (10) describes the trips that are taken by the users. When calling the method, a Trip ID (11) must be supplied to distinguish the user's trip. The Trip ID (11) is the primary key of the Trips Table (10) and acts as a foreign key for the other inputs. Each user should be assigned a User ID (12) to exclude his/her other trips from consideration. The user's beginning location is stored in the table as the Source Location (14) and the user's ending location is stored as the Destination Location (15). A trip can consist of a maximum of two legs: Leg 1 refers to the initial trip from source to destination; Leg 2 (optional) is the return trip from the destination back to the source. The user's preference of one-way or roundtrip is indicated by the Roundtrip (16) attribute. The Recurring (17) attribute indicates whether the trip occurs once or on a regular basis. The earliest and latest times a user is willing to leave the Source Location (15) are stored as the Earliest Depart Time—Leg 1 (18) and Latest Depart Time—Leg 1 (19), respectively. The earliest and latest times a user is willing to arrive at the Destination Location (15) are stored as the Earliest Arrive Time—Leg 1 (20) and the Latest Arrive Time—Leg 1 (21), respectively. If a user has chosen a roundtrip, the earliest and latest depart times that the user can leave for the return trip are stored as the Earliest Depart Time—Leg 2 (22) and the Latest Depart Time—Leg 2 (23), respectively, and the earliest and latest times that the user can arrive at the original source for the return trip are stored as the Earliest Arrive Time—Leg 2 (24) and the Latest Arrive Time—Leg 2 (25), respectively. For the Carpool Type (13) attribute, the user can choose 'driver', 'passenger', or 'no preference'. A value of 'driver' indicates that the user is only willing to carpool as the driver, a value of 'passenger' indicates that the user is only willing to carpool as the passenger, and a value of 'no preference' indicates that the user is willing to carpool as either the passenger or the driver. The first and last dates of the trip are stored as the Start Date (26) and End Date (27). Once the ride matching method determines the shortest path from source to destination, the Driving Time (28) and Driving Distance (29) of the shortest path are stored in the table for use in future runs of the method.

Figure 10:
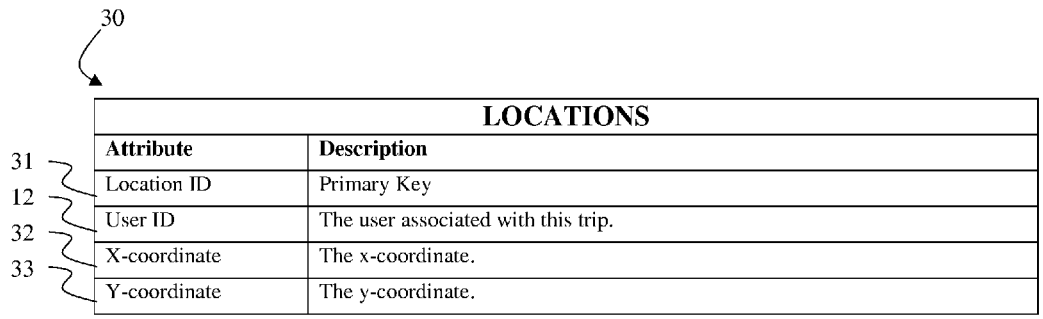
FIG. 10 is a description of the database attributes of the Location Table. The Location Table stores the locations of users' source and destination points.

Locations Module: In one embodiment, the invention stores a plurality of parameters relating to the user's source and destination locations. In a preferred embodiment, these parameters are stored in a Locations Table (30). A description of each of the attributes of the Locations Table (30) is shown in FIG. 10. The Locations Table (30) stores the addresses of source and destination points. Each location is identified by its address which is stored as the Location ID (31). The Location ID (31) is the primary key of the Locations Table (30). Each location is also associated with a particular user, via the User ID (12), and can be associated with several of the user's trips. The table also stores the x- (32) and y- (33) coordinates of each location.

Figure 11:
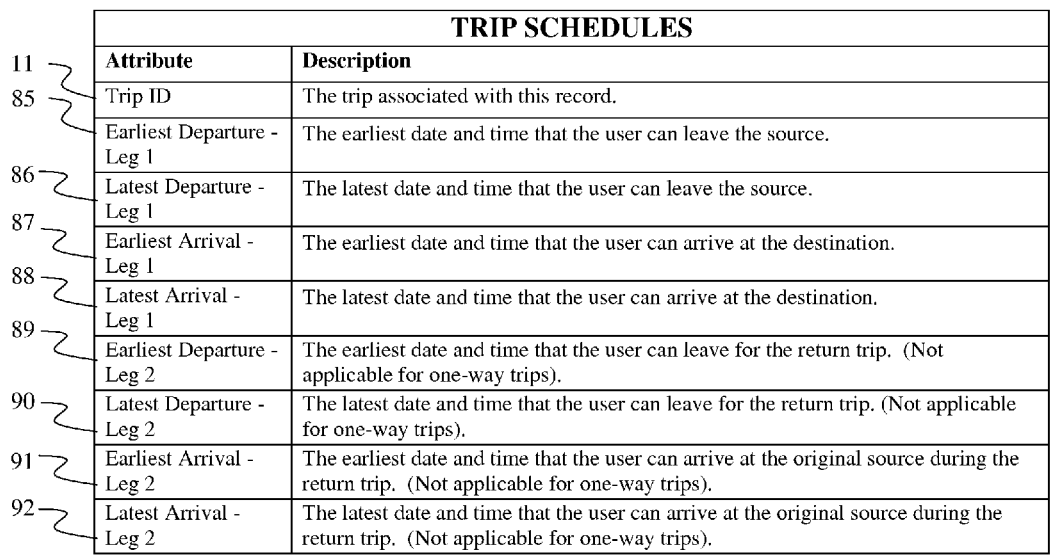
FIG. 11 is a description of the database attributes of the Trip Schedules Table. The Trip Schedules Tables stores the details of each trip instance.

Scheduling Module: In one embodiment, the invention stores a plurality of parameters relating to the user's required departure and arrival days and times. In a preferred embodiment, these parameters are stored in a Trip Schedules Table (34). A description of each of the attributes of the Trip Schedules Table (34) is shown in FIG. 11. The method is unique in its ability to accept trips with schedules that cannot be expressed in terms of a regular weekly trip. The method's flexibility is due to the fact that a trip's recurrence pattern is translated into a series of trip instances. A trip instance is defined as a specific occurrence of a trip. One-time trips are associated with one instance, while recurring trips are associated with several. For example, a trip that is scheduled for every Friday in March will be associated with 4 records in the Trip Schedules Table (34). One of these records will correspond to the trip that occurs on Friday, March 25. Each trip, identified by the Trip ID (11), is associated with the following time windows: {Earliest Departure—Leg 1 (85), Latest Departure—Leg 1 (86)} and {Earliest Arrival—Leg 1 (87), Latest Arrival—Leg 1 (88)}. A round-trip is also associated with the following time windows: {Earliest Departure—Leg 2 (89), Latest Departure—Leg 2 (90)} and {Earliest Arrival—Leg 2 (91), Latest Arrival—Leg 2 (92)}. Each trip instance is stored as one record in the Trip Schedules Table (34).

Points Feature Module: In one embodiment, the invention stores a plurality of parameters relating to the coordinates of the user's source and destination points. In a preferred embodiment, these parameters are stored in a Points Feature Class (35). A description of each of the attributes of the Points Feature Class (35) is shown in FIG. 12. The Points Feature Class (35) stores the geocoded source and destination line points of all the trips in the Trips Table (10). The coordinates of this line point are stored as a Shape (37) in the Point Feature Class (35). Each entry is given a unique Object ID (36) which serves as the primary key for the table. Each of the trips is linked to its corresponding entry in the Trips Table (10) by the Trip ID (11), a foreign key. The table also includes a Class (38) attribute which indicates if the point represents the source point or a destination point.

Shortest Path Feature Module: In one embodiment, the invention stores a plurality of parameters relating to the shortest path between to points. In a preferred embodiment, these parameters are stored in a Shortest Path Feature Class (39). Dijkstra's shortest path method is used to calculate a path from the user's source to destination. This path is based on the actual street network. The path is saved in the Shortest Path Feature Class (39). A description of each of the attributes of the Shortest Path Feature Class (39) is shown in FIG. 13. Each entry is given a unique Object ID (36) which serves as the primary key for the table. The coordinates of the line segment are stored as the Shape (37) and the length of the line segment is stored as the Shape Length (40). Each of the trips is linked to its corresponding entry in the Trips Table (10) by the Trip ID (11), a foreign key.

Figure 1:
FIG. 1 is a map representing a trip from a user's source to a user's destination.
Figure 2A:
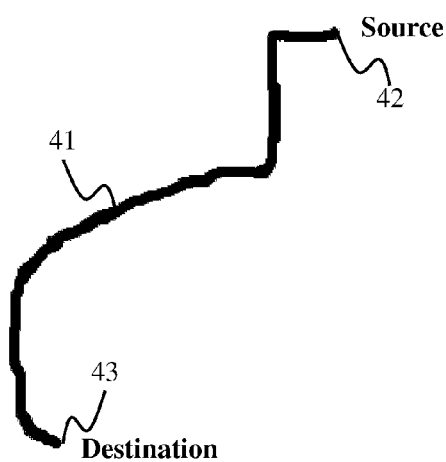
FIG. 2A is an illustration representing the path of the trip of FIG. 1.
Figure 2B:
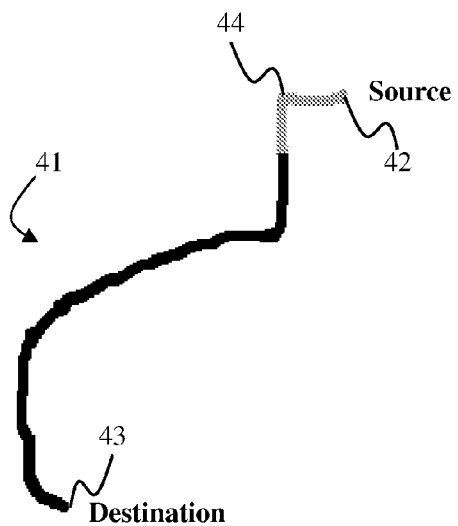
FIGS. 2B through 2D are illustrations representing the path of the trip of FIG. 1 split into three segments.
Figure 2C:
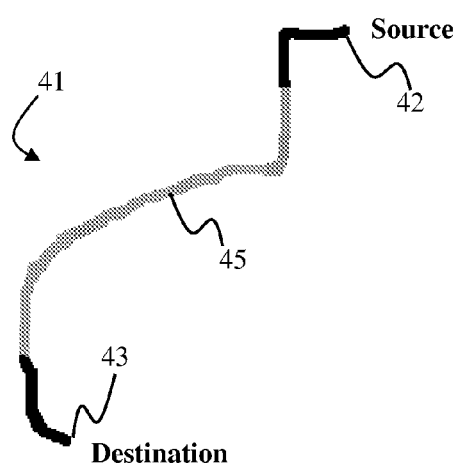
Figure 2D:
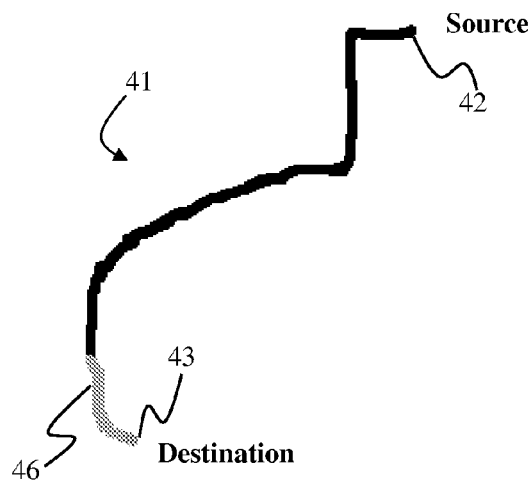

FIG. 1 shows an example of the shortest path (41) between a Source (42) and a Destination (43) on a map. FIG. 2A shows the same path (41) without the map as a background. As shown in FIGS. 2B through 2D, the shortest path (41) is split into three segments. The first segment (44), highlighted in FIG. 2B, represents the first 15% of the path (41). The second segment (45), highlighted in FIG. 2C, represents the middle 70% of the path (41). The third segment (46), highlighted in FIG. 2D, represents the final 15% of the path (41).

The next step is determining those trips in the search space whose source and destination are 'close' to that of the user. 'Close' is a relative term that, by default, is based on a percentage of the total length of the shortest path. This allows the method to scale to both local and long-distance trips.

Figure 3:
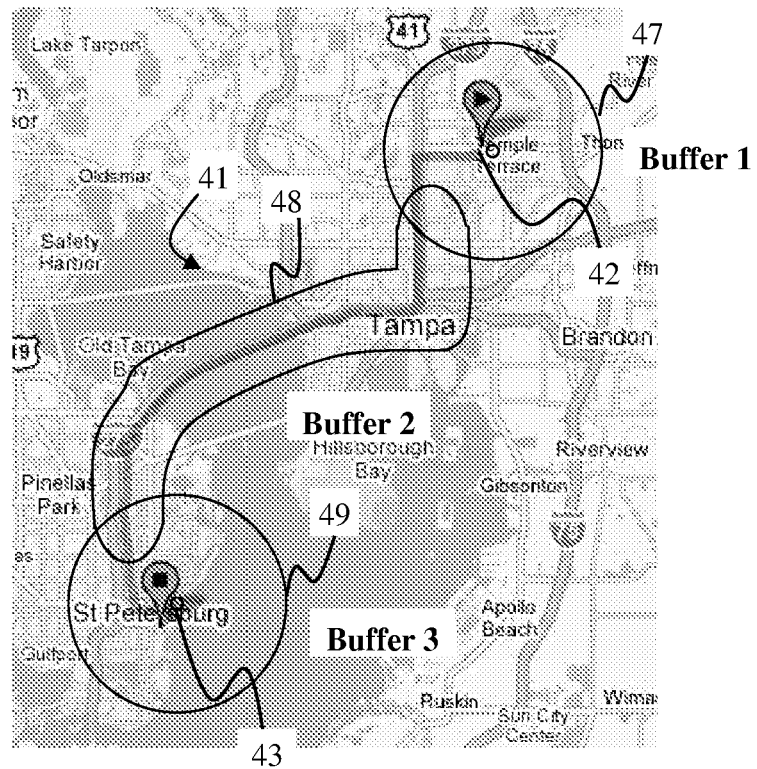
FIG. 3 is an illustration representing the creation of buffers from a source to a destination in a trip.

A buffer is a zone of a specified distance around a feature. A map illustrating the buffer zones is shown in FIG. 3. Buffer 1 (47) is applied around the Source (42) with a radius of 15% of the path (41) length. For example, if the total length of the path (41) is 10 miles, the first buffer (47) will represent a radial search of 1.5 miles. Buffer 2 (48) is applied around Segment 2 (45), the middle 70% of the path (41), with a radius of 5% of the path (41) length. For a path (41) of 10 miles, this buffer (48) will represent one-half mile on either side of the path (41). Buffer 3 (49) is applied around the Destination (43) with a radius of 15% of the path (41) length.

The method creates a match list by performing a spatial query on the Points Feature Class (35) and then using the resulting Trip IDs (11) to query the attributes of the Trips Table (10) and the Trip Schedules Table (34).

Spatial Query: The method queries the Points Feature Class (35) to locate trips with Source (42) and Destination (43) points within the buffers. The method distinguishes itself in the fact that, in addition to the customary radial search around the endpoints (Buffer 1 (47) & Buffer 3 (43)), it also looks for matches within the middle of the path (Buffer 2 (48)). In the worst case, the method will find the same matches that a traditional method would. In the best case, the method is able to find additional matches by looking along the path (41). Each query results in a list of Trip IDs (11) that can then be used to query the Trips Table (10) and the Trip Schedules Table (34).

Attribute Query: A round-trip requires that a match be available for both portions of the trip. In a one-way trip, the user is either not returning to the source, not interested in carpooling for the return trip, or not concerned with carpooling with different people on each portion of the trip. A match must follow certain rules which are shown in the Table of FIG. 14. A match is found when two users both require a round-trip (51) or when both users only require a one-way (52) trip. No match is found when one user requires a round-trip and the other requires a one-way (50) trip or vice versa (53).

Users are given the option of limiting the search to only finding drivers or only finding passengers. If a preference is given, a match must follow certain rules which are shown in the Table of FIG. 15. A match is found when one user requests to be a driver and the other requests to be a passenger (55) or vice versa (56). No match is found when two users both request to be a driver (54) or when both users request to be a passenger (57).

The Trip Schedules Table (34) is queried to locate overlapping trip instances. A match must have at least one instance which overlaps with an instance of the user's trip.

Below are examples of different queries (spatial query followed by attribute query):

1. Source point (42) in Buffer 1 (47), Destination point (43) in Buffer 3 (49)
   Relative Direction=Same
   Overlapping departure times or overlapping arrival times for Leg 1
   If the user and match have roundtrips, look for overlapping departure and arrival date/times for Leg 2
   Match roundtrip/one-way preference
   Match driver/passenger preference
2. Source point (42) in Buffer 2 (48), 1 (47), or 3 (49), Destination point (43) in Buffer 3 (49)
   Relative Direction=Same
   Overlapping arrival date/times for Leg 1
   If the user and match have roundtrips, also look for overlapping departure and arrival date/times for Leg 2
   Match roundtrip/one-way preference
   Match driver/passenger preference
3. Source point (42) in Buffer 3 (49), Destination point (43) in Buffer 1 (47)
   Relative Direction=Opposite
   Overlapping departure date/times or arrival date/times for user's Leg 2 and match's Leg 1
   If the user and match have roundtrips, look for overlapping departure and arrival date/times for user's Leg 1 and match's Leg 2
   Match roundtrip/one-way preference
   Match driver/passenger preference
4. Source point (42) in Buffer 2 (48), 1 (47), or 3 (49), Destination point (43) in Buffer 1 (47)
   Relative Direction=Opposite
   Overlapping arrival date/times for user's Leg 2 and match's Leg 1
   If the user and match have roundtrips, look for overlapping departure and arrival date/times for user's Leg 1 and match's Leg 2
   Match roundtrip/one-way preference
   Match driver/passenger preference Matches Table: If any Trip IDs (11) are returned from the queries, the matches are stored in the Matches Table (58). A description of each of the attributes of the Matches Table (58) is shown in FIG. 16. Each entry in the Match Table (58) is given a unique Match ID (59) which serves as the primary key for the table. Two trip IDs, Trip ID 1 (60) and Trip ID 2 (61), are stored for two trips that is similar in schedule and path to each other. The Trip ID of the person who should be the driver is stored in the Match Table (58) as the Driver (62). The Total Driving Time (64) attribute stores the total time the driver must travel, including pick-up and drop-off of the passenger. The Direction for Trip 1 (65) indicates if Trip 2 can travel roundtrip, leg 1, or leg 2 and the Direction for Trip 2 (66) indicates the same for Trip 1. The Relative Direction (67) attribute indicate 'same' if Trips 1 and 2 are traveling on the same leg or 'opposite' if one user is on leg 1 while the other is on leg 2.

Figure 4:
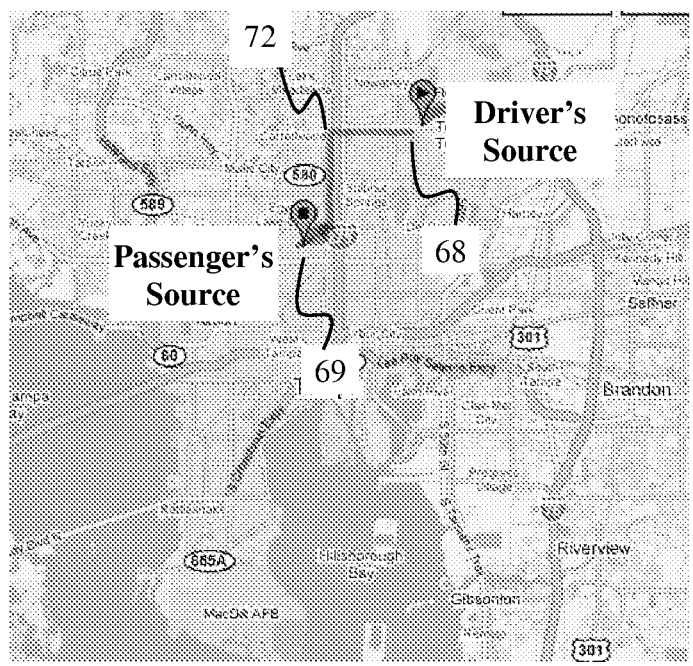
FIG. 4 is an illustration representing the path from the Driver's source to the Passenger's source.
Figure 5:
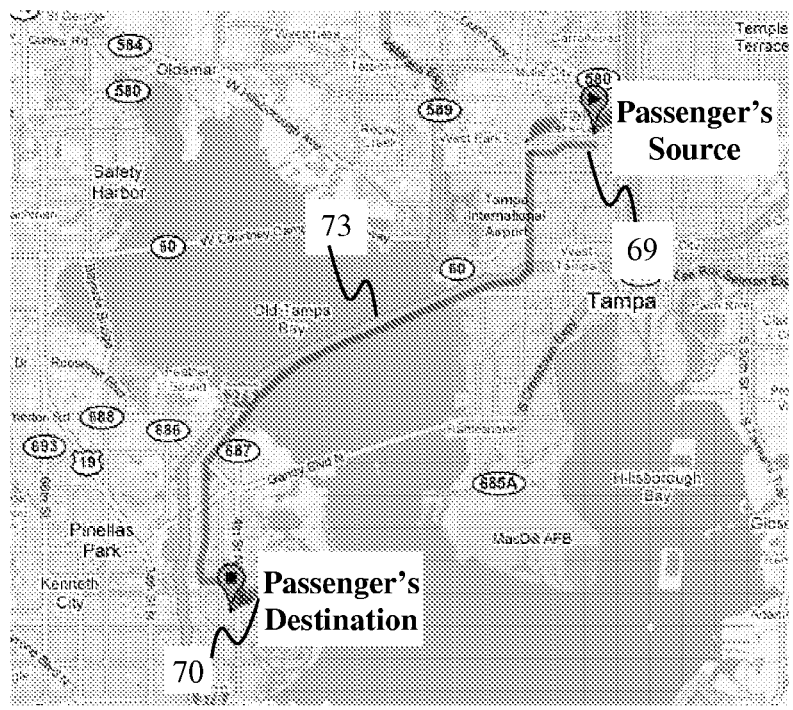
FIG. 5 is an illustration representing the path from the Passenger's source to the Passenger's destination.
Figure 6:
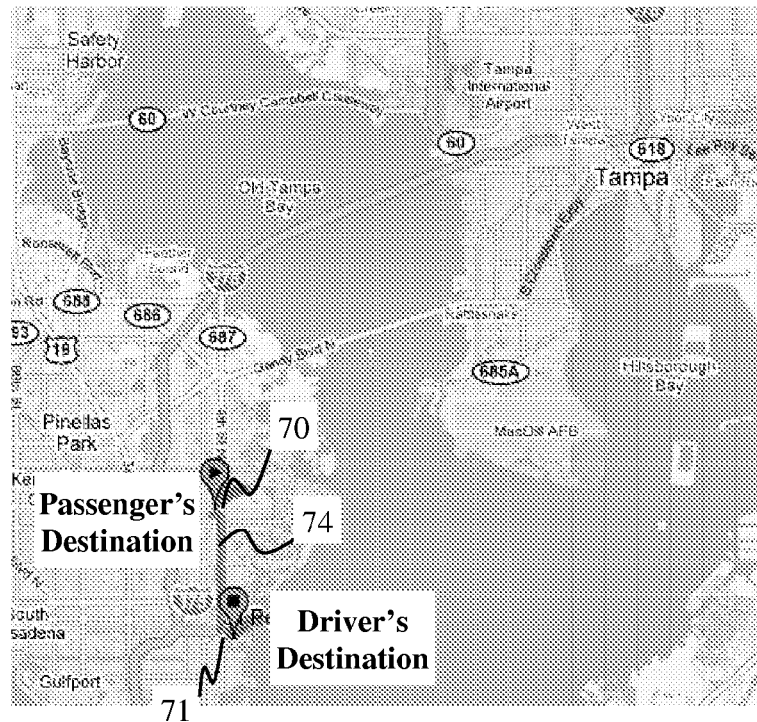
FIG. 6 is an illustration representing the path from the Passenger's destination to the Driver's destination.

The Total Driving Distance (63) is calculated in three steps as illustrated in FIGS. 4 through 6. Length 1 (72), as illustrated in FIG. 4, is the length of the shortest path from the Driver's Source (68) to the Passenger's Source (69). Length 2 (73), as illustrated in FIG. 5, is the length of the shortest path between the Passenger's Source (69) and the Passenger's Destination (70). Length 3 (74), as illustrated in FIG. 6, is the length of the shortest path from the Passenger's Destination (70) to the Driver's Destination (71). In the case where both the user and the match have stated that they can be drivers or passengers, the driving distance calculation is performed twice—once with the user as the driver, and once with the match as the driver. The combination with the shortest driving time will determine who is designated as the driver.

Figure 7:
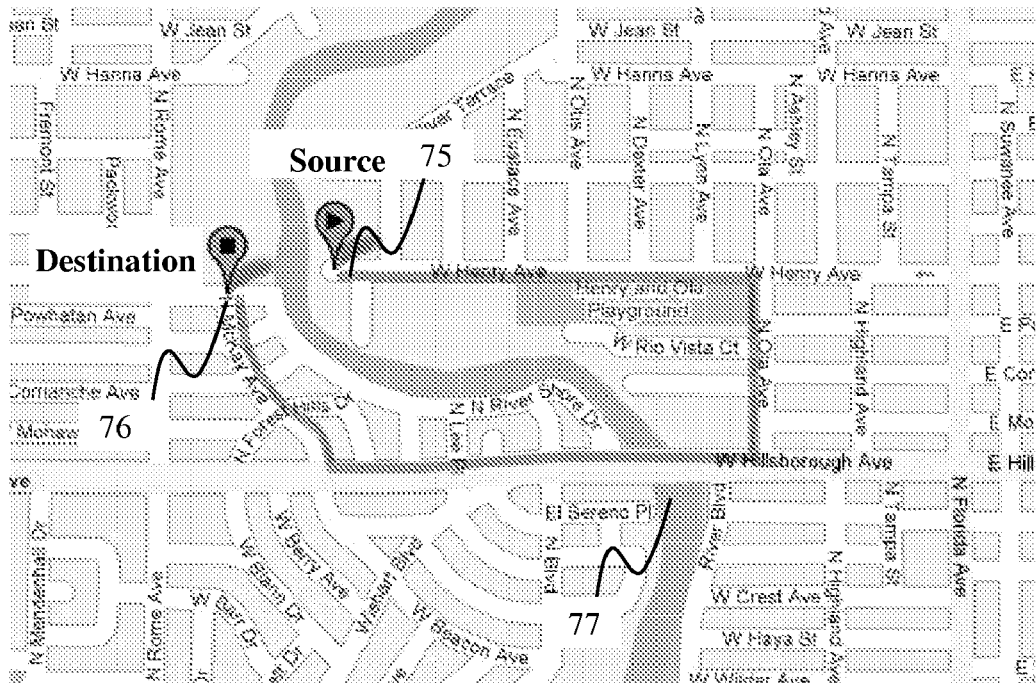
FIG. 7 is an illustration representing the path around a river.

Calculating Length 1 (72) and Length 3 (74) using shortest paths has several advantages over relying on the straight-line distance between features. A straight-line distance can be deceiving because it cannot take into account barriers. A barrier can be either natural or man-made and impedes travel. Consider the following scenarios:

Two houses lie on opposite sides of a river. This scenario is illustrated in FIG. 7. To travel from one house, the Barriered-Source (75), to the other house, the Barriered-Destination (76), requires traveling to a bridge and crossing the river (77).

Two houses lie on opposite sides of an interstate. To travel from one house to the other requires traveling to an underpass.

A user's path requires travel on an interstate. A match lies next to the interstate. The straight-line distance from the match to the interstate is negligible. However, the user must actually travel to the nearest exit, pick up the match, and travel back to the interstate before continuing his trip.

Figure 8:
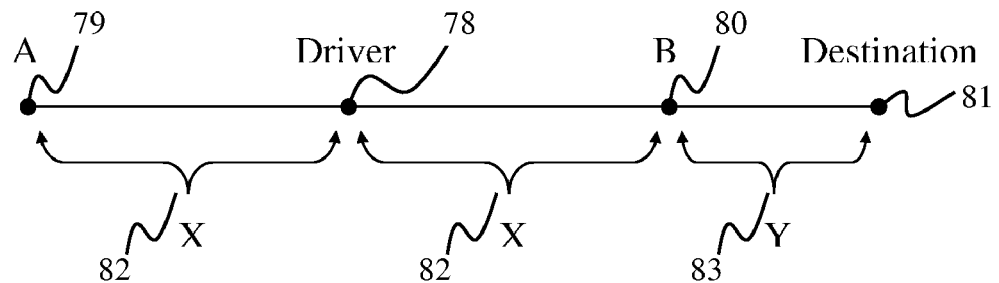
FIG. 8 is an illustration highlighting the importance of the direction of travel.

The inclusion of Length 2 (73) in the distance calculation is to favor those matches that lie in the direction of the driver's travel. Consider a scenario, illustrated in FIG. 8, where a Driver (78) and two passengers, Passenger A (79) and Passenger B (80), have the same destination, D (81). The source points of the passengers lie at an equal distance, X (82), on either side of the driver. Lengths 1 (72) and 3 (74), represented by a distance X (82), will be identical for both passengers. However, if Passenger B (80) lies in the direction that the driver would normally travel and Passenger A (79) lies in the opposite direction, these passengers will not have the same Total Driving Distance (63) because Length 2 (73) for Passenger B (80), represented by a distance Y (83), will be smaller than Length 2 (73) for Passenger A (79). The Total Driving Distance (63) for Passenger A (79) is X+(2X+Y)+0. The Total Driving Distance (63) for Passenger B (80) is X+Y+0. All other things being equal, if the driver must choose one passenger, Passenger B (80) is the clear choice because the path deviation is smaller.

Carpool Shortest Path Feature Class: A description of each of the attributes of the Carpool Shortest Path Feature Class (84) is shown in FIG. 17. The Carpool Shortest Path Feature Class (84) stores the shortest path between two points (source and destination) of the Points Feature Class (35). Each entry is given a unique Object ID (36) which serves as the primary key for the table and the coordinates of the line segment are stored as the Shape (37). The length of the line segment is stored as the Shape Length (40). Each of the trips is linked to its corresponding entry in the Trips Table (10) by the Match ID (11), a foreign key.

The disclosure of all publications cited above are expressly incorporated herein by reference, each in its entirety, to the same extent as if each were incorporated by reference individually.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A dynamic ride matching method comprising
storing a plurality of trips in a trip module, wherein each trip further comprises a plurality of attributes including a source location, a destination location and a shortest path between the source location and the destination location;
segmenting the shortest path between the source location and the destination location into a plurality of path segments;
defining a plurality of radial buffers, each of the plurality of radial buffers defined around one of each of the plurality of path segments and each of the plurality of radial buffers having a radius equal to a predetermined percentage of a length of the shortest path between the source location and the destination location;
associating each of the plurality of radial buffers with at least one attribute of the plurality of attributes for each trip in the trip module;
storing at least one scheduling parameter associated with each of the plurality of trips in a scheduling module; and
matching trips in the trip module having correlating trip attributes in at least one of the plurality of radial buffers and correlating scheduling parameters in the scheduling module.

2. The method of claim 1 wherein the trip module comprises at least one attribute selected from the group consisting of a trip ID, a user ID, carpool type, trip type, recurrence, earliest departure time, latest departure time, earliest arrival time, latest arrival time, start date, end date, driving time and driving distance.

3. The method of claim 1 wherein the trip is segmented into a first leg and a second leg.

4. The method of claim 3 wherein the first leg is the segment of the trip from the source location to the destination location and the second leg is the segment from the destination location to the source location.

5. The method of claim 1 wherein the scheduling parameter is selected from the group consisting of earliest departure date, earliest departure time, latest departure date, latest departure time, earliest arrival date, earliest arrival time, latest arrival date and latest arrival time.

6. The method of claim 1, further comprising identifying trips having a trip attribute within the same radial buffer, wherein the trip attribute is selected from the group consisting of the source location, the destination location and the shortest path between the source location and the destination location.

7. The method of claim 1, further comprising associating at least one trip instance with each trip.

8. The method of claim 7, further comprising identifying trips with overlapping trip instances.

9. The method of claim 1, further comprising associating at least one trip type with each trip.

10. The method of claim 9 wherein the trip type is selected from the group consisting of one-way trip and round-trip.

11. The method of claim 9, further comprising identifying trips with matching trip types.

12. The method of claim 1, further comprising associating a user type with each trip.

13. The method of claim 12 wherein the user type is selected from the group consisting of driver, passenger and no preference.

14. The method of claim 13, further comprising identifying trips with matching user types.

15. The method of claim 14, wherein:
trips with driver user types do not match to other trips with driver user types;
trips with passenger user types match with at least one trip with a driver user type.

16. The method of claim 1, further comprising calculating the shortest path from the source location to the destination location.

17. The method of claim 16, wherein the shortest path from the source location to the destination location is calculated using Dijkstra's algorithm.

18. The method of claim 1, further comprising calculating the shortest travel time between the source location and the destination location.

19. The method of claim 1 wherein the plurality of path segments include a source path segment, a mid-path segment and a destination path segment and the plurality of radial buffers include a source buffer, a mid-path buffer, and a destination buffer for each trip in the trip module.

* * * * *